Feb. 8, 1927.  
W. J. KENNEY  
1,617,288  
METHOD OF AND APPARATUS FOR RECONDITIONING ZEOLITE WATER SOFTENERS  
Filed March 16, 1925  2 Sheets-Sheet 2
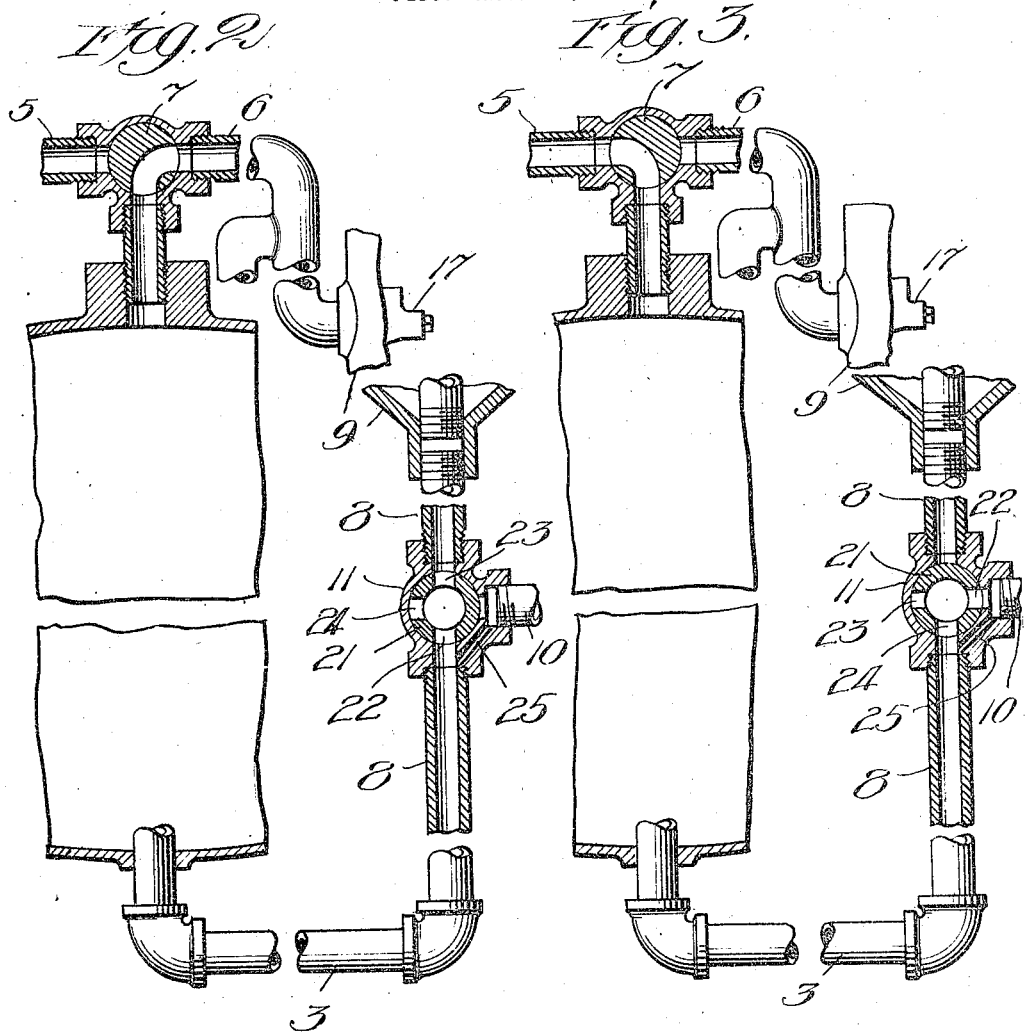
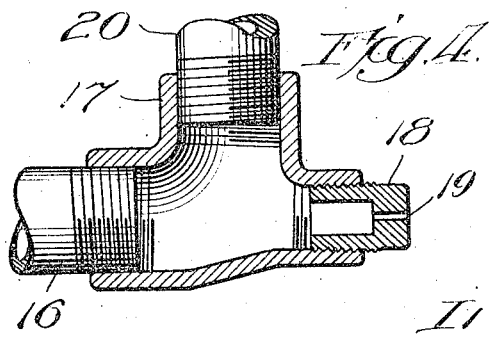
Inventor:  
W. J. Kenney,  
by Wm. F. Freudenreich  
Atty Patented Feb. 8, 1927.

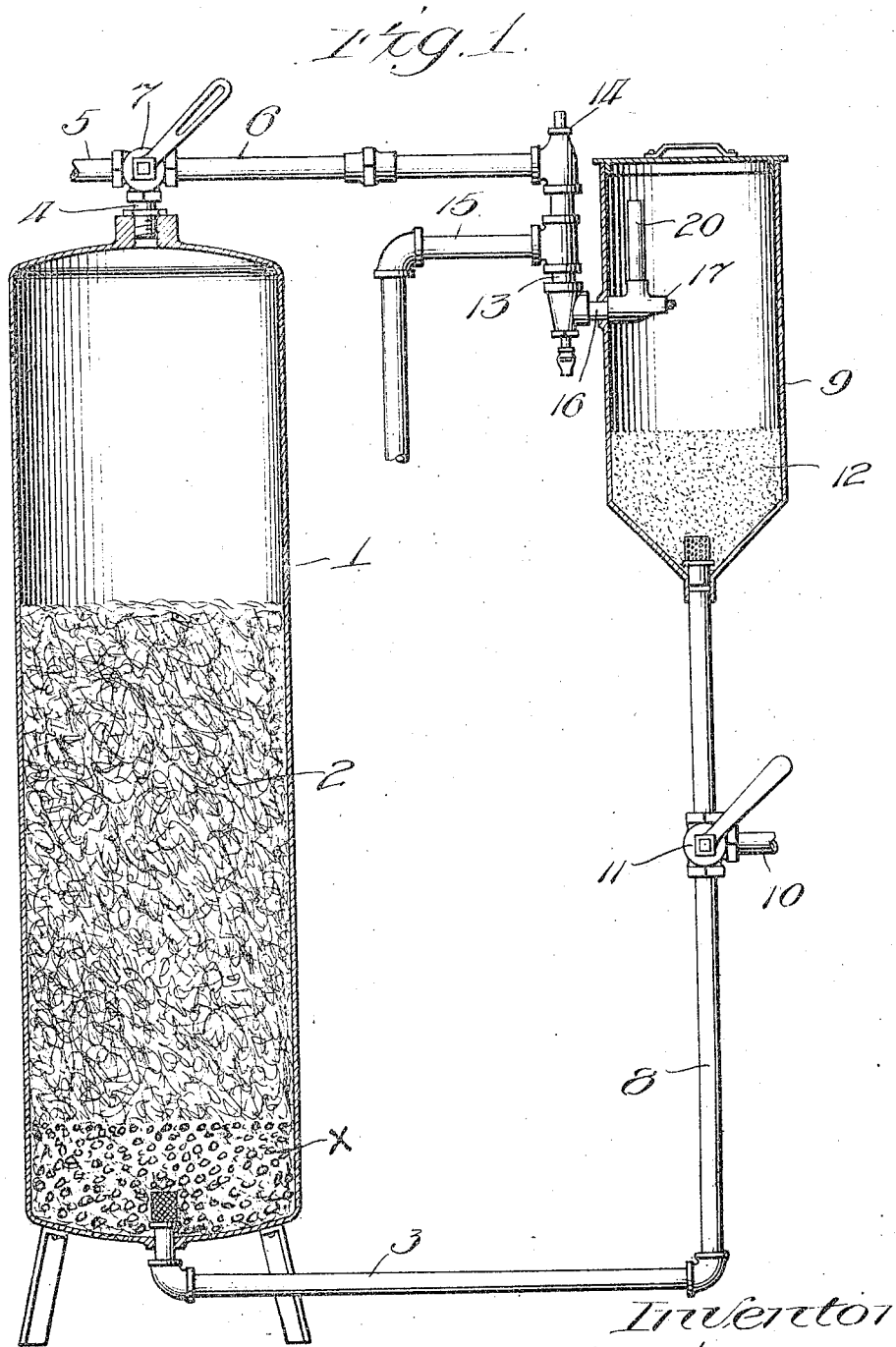

1,617,288

UNITED STATES PATENT OFFICE.

WILLIAM J. KENNEY, OF CHICAGO, ILLINOIS, ASSIGNOR TO ZEOLITE ENGINEERING CO., A CORPORATION OF ILLINOIS.

METHOD OF AND APPARATUS FOR RECONDITIONING ZEOLITE WATER SOFTENERS.

Application filed March 16, 1925. Serial No. 15,777.

The object of the present invention is to produce a simple and novel method of reconditioning zeolite water softeners by recirculating washing water from the softening tank through a supply of salt to dissolve the same.

A further object of the present invention is to produce a water softening apparatus, of the type in which the raw water is caused to flow through a body of zeolitic material, which shall consist of a few simple rugged parts, whereby it may be manufactured at a low cost, will retain its efficiency indefinitely, and in which regeneration may be effected in a simple and easy manner.

The regeneration of the zeolitic material is effected by passing a brine solution through the same, the brine being most conveniently obtained by passing water through a pot containing salt. Viewed in one of its aspects, my invention may be said to have for its object to produce a simple and novel regenerating arrangement employing a salt pot that is easily accessible and which is not under the pressure of the system, thus avoiding the need of a tightly secured closure and permitting the pot to be opened even during the process of regeneration.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a view of an apparatus arranged in accordance with my invention, the treating tank and the salt pot being shown in section while the various connections are shown in elevation; Fig. 2 is a sectional view, more or less diagrammatic, through portions of the apparatus, showing the positions of the valves during the time regeneration is taking place; Fig. 3 is a view similar to Fig. 2 showing the position of the valves during the ordinary use of the apparatus and Fig. 4 is a sectional view, on an enlarged scale, through the water inlet to the salt pot.

Referring to the drawings, 1 represents a tank or reservoir of any usual or suitable construction, preferably a closed vertical cylinder. This tank is partly filled with a suitable zeolitic material 2. The water to be softened may be passed through the bed of zeolitic material either in the form of an upflow or downflow, and the brine for regeneration purposes, may also be passed through the zeolitic material in the upward or downward direction. Furthermore, the directions of flow of the water to be treated and of the brine are not dependent on each other and may be the same in both cases or opposite to each other. However, for the sake of brevity, I have illustrated only a single form of apparatus, in which the flow of the raw water to be treated and of the brine is upward through the body of zeolitic material, and the detailed description will be confined to this particular arrangement.

The incoming water or brine enters the bottom of the tank through a pipe 3 and leaves the tank at the top through an outlet connection 4. There are two branch pipes, 5 and 6, extending in opposite directions from the connection 4 and, between these pipes, is a valve 7 that may place either pipe in communication with the interior of the tank and simultaneously cut off communication between the other pipe and the tank. The pipe 5 is the service pipe that carries the water to the point where it is to be consumed, while the pipe 6 is a waste pipe to carry away the brine after it has passed through the zeolitic material to regenerate the same.

The supply pipe 3 is connected to the lower end of a vertical pipe 8 whose upper end is connected to the bottom of a salt pot 9. The raw water to be treated enters the pipe 8 from a pipe 10 through a valve 11 so constructed, as will hereinafter be explained, that in one position of the valve only raw water flows into the tank while in another position a dilute brine solution is delivered into the tank.

In the bottom of the salt pot is a filter bed 12, preferably of gravel, above which is left sufficient space to receive a charge of salt adapted to effect one regeneration of the bed of zeolitic material; this space being made large enough so that the maximum quantity of salt that may be required may be received. In order to convert the salt into a brine solution, I utilize a part of the waste water that is discharged through the waste pipe 6. This is accomplished by connecting the pipe 6 to the upper end of a short stand pipe 13 closed at the bottom and vented at the top to atmosphere through a suitable vent 14. The pipe 15 that finally carries the waste liquid to the sewer or other discharge point is connected to the stand pipe at some distance above the bottom of the latter. A short horizontal pipe 16 extends from the lower portion of the stand pipe through the wall of the salt pot, at a considerable distance above the filtering bed. On the inner end of the pipe 16 is a T-shaped fitting 17. A plug 18, provided with a small perforation or port 19, is attached to that branch of the fitting opposite that into which the pipe 16 is screwed; and there is an open-ended riser 20 extending upwardly from this fitting into the vicinity of the top of the salt pot.

It will thus be seen that when the treating tank is discharging through the waste pipe 6, during regeneration, the stand pipe 13 must become filled up to the level of the connection between it and the pipe 15 before there can be any flow out through the pipe 15. Consequently there will be a head of liquid in the stand pipe above the port or orifice 19 and some of the liquid leaving the treating tank will therefore enter the salt pot. This head will always be maintained in the stand pipe during the regenerating process, so that there will be a constant flow of liquid into the salt pot.

The valve 7 at the outlet from the treating reservoir or tank may be an ordinary three-way valve as best shown in Figs. 2 and 3, since its only function is to place either of the pipes 5 or 6 in communication with the interior or the reservoir and at the same time shut off communication between the other pipe and the reservoir. The valve 11 is also a three-way valve, but of special construction. This valve, as shown, has for its movable member a rotatable hollow plug 21. Three ports, 22, 23 and 24, are cut through the wall of the plug, the ports 22 and 23 being opposite each other and spaced 90° apart from the port 24; whereby, when the plug is in the position shown in Fig. 3 that portion of the pipe 8 below the valve will be placed in direct communication with the raw water pipe 10, the outlet from the salt pot being closed. When the valve is in the position shown in Fig. 2, the raw water supply is shut off and the bottom of the salt pot is placed in communication with the bottom of the treating reservoir. However, in order to permit a restricted flow of raw water at this time, the valve casing is provided with a small passage 25 constituting a restricted by-pass between the raw water pipe and that portion of the pipe 8 below the valve. The passage 25 is so disposed that it permits a small stream of water to flow from the raw water pipe 10 in a generally downward direction into that portion of the pipe 8 below the valve.

In Fig. 3 the valves are shown in the positions which they occupy during normal use of the apparatus, that is, while softened water is being supplied therefrom; the waste pipe and the salt pot being completely shut off from any communication with the treating reservoir; and the raw water simply flowing from the pipe 10, through the valve 11 and by-pass 25, pipes 8 and 3, into the bottom of the treating reservoir. The water thus entering the reservoir rises through the bed of zeolitic material and passes out through the valve 7 and pipe 5 to supply the demand for softened water. After the apparatus has been used sufficiently long to make it necessary or desirable to regenerate the zeolitic material, the valves 7 and 11 are turned into the positions shown in Fig. 2. The flow of raw water is now restricted to a small stream through the restricted passage 25 in the casing of valve 11, so that the flow through the pipes 8 and 3 into the reservoir, is much slower than during normal use. As water enters the bottom of the reservoir, that at the top is forced out into the waste pipe 6. The waste pipe empties first into the stand pipe 13, so that a part of the discharge from the reservoir flows through the orifice 19 into the salt pot, while the larger portion passes on through the pipe 15. Assuming that the salt pot contains a proper charge of salt, it will be seen that the incoming water dissolves the salt to form brine. There is nothing to prevent this brine from flowing out of the bottom of the salt pot and it therefore does so, passing through the valve 11 and mingling with the raw water entering through the restricted port or passage 25. Since the raw water will usually be under considerable pressure, the water discharged through the passage 25 will have an injector effect on the brine, assisting gravity in drawing the brine down from the salt pot. Consequently the water that flows into the treating reservoir is transformed into a diluted brine just below the valve 11. It will be seen that the brine in the salt pot is produced entirely by water or dilute brine recirculated from the treating reservoir into the salt pot where it acts to dissolve the charge of salt. It is necessary always to add some fresh or raw water to the fluid that is being re-circulated through the treating reservoir and therefore the passage 25 in the casing of valve 11 is made larger than the inlet orifice 19 to the salt pot, so that more water will enter the inlet pipe to the reservoir than can flow into the salt pot through the inlet orifice 19; and consequently there will always be an overflow from the stand pipe through the waste pipe 15 during the regenerating process.

By recirculating a part of the liquid discharged from the treating reservoir during regeneration, and using such recirculated liquid to dissolve the required salt, there is not only a saving in water but perfect control of the formation and delivery of the brine is obtained without placing the interior of the salt pot either under the pressure of the dispensing system or that in the water supply main; there being no pressure whatever on the liquid in the salt pot except the natural head due to the height of the column in the pot.

It will thus be seen that I have produced a simple and economical method for reconditioning zeolite softeners and have devised an apparatus composed of simple, strong parts including but two valves, for carrying out my improved method; so that the apparatus is not only economical in operation but is well adapted for use for household purposes and elsewhere where it is operated by comparatively unskilled persons.

While I have illustrated and described with particularity only a single preferred form of apparatus for carrying out my invention, I do not desire to be limited to the exact structural details thus illustrated and described; but intend to cover all forms and arrangements which come within the definitions of my invention constituting the appended claims.

I claim:

1. In an apparatus of the character described, a treating reservoir, a salt pot, and means for causing a portion of the liquid discharged from the reservoir during regeneration to be passed through the salt pot and recirculated through the reservoir.

2. In an apparatus of the character described, a treating reservoir having an outlet for liquid discharged during regeneration, a salt pot, means for introducing water into the reservoir, and means for recirculating a portion of the liquid discharged from the reservoir and causing it to pass through the salt pot and then enter the reservoir with the incoming water.

3. In combination, a treating reservoir, a salt pot, a source of supply of water, means for causing water to flow from said source through said reservoir, and means for causing a portion of the liquid leaving the reservoir to flow through said salt pot and mix with the water entering said reservoir.

4. In an apparatus of the character described, a treating reservoir, having a waste pipe for carrying away liquid discharged from the reservoir during regeneration, a salt pot, means for causing some of the liquid entering the waste pipe to be withdrawn therefrom and delivered to the salt pot, and means introducing water into the reservoir and causing said water on its way to the reservoir to be mixed with brine withdrawn from said salt pot.

5. In an apparatus of the character described, a treating reservoir, a stand pipe, a salt pot, there being a restricted passage connecting the lower end of the stand pipe with the salt pot, a waste pipe connected with the stand pipe at a point above said passage, a discharge conduit for the reservoir connected to said stand pipe above said passage, a pipe connecting the bottom of the salt pot with the inlet side of said reservoir, and means for introducing water into the latter pipe at a point between the pot and the reservoir and causing it to flow toward the reservoir.

6. In an apparatus of the character described, a treating reservoir having a discharge conduit for carrying away liquid discharged during regeneration, a salt pot, there being normally a restricted outlet from said conduit into said salt pot, and means for withdrawing brine from the salt pot and delivering it to the reservoir mixed with fresh water.

7. In an apparatus of the character described, a treating reservoir having a discharge conduit for carrying away liquid discharged during regeneration, a salt pot, there being a restricted outlet from said conduit into said salt pot, means for positively insuring a head of liquid at said outlet sufficient to insure a flow into the salt pot and less than that which would cause the pot to overflow when no brine is being withdrawn, and means for withdrawing brine from the salt pot and delivering it to the reservoir mixed with fresh water.

8. In an apparatus of the character described, a treating reservoir, a stand pipe, a salt pot, there being a restricted outlet from the standpipe to the salt pot, a waste pipe connecting the outlet side of the reservoir with the stand pipe, and there being a main discharge outlet from the stand pipe at a point above the said restricted outlet and much larger than the same.

9. The method of reconditioning a zeolite water softener, which consists in causing washing water to flow through the same, causing a portion of the washing water discharged from the softener to take up salt, and then returning such water to the softener with the washing water.

10. The method of reconditioning a zeolite water softener which consists in causing a continuous flow of washing water through the softener, continuously withdrawing waste water from the softener and causing it to take up salt, and continuously feeding such salted waste water into the softener along with the washing water.

In testimony whereof, I sign this specification.

WILLIAM J. KENNEY.